United States Patent
Yi et al.

(10) Patent No.: US 9,924,376 B2
(45) Date of Patent: Mar. 20, 2018

(54) METHOD FOR ENHANCING COVERAGE OF USER EQUIPMENT AND AN APPARATUS USING THE SAME

(71) Applicant: LG ELECTRONICS INC., Seoul (KR)

(72) Inventors: Yunjung Yi, Seoul (KR); Joonkui Ahn, Seoul (KR); Hyangsun You, Seoul (KR); Bonghoe Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 14/896,327

(22) PCT Filed: Jun. 23, 2014

(86) PCT No.: PCT/KR2014/005537
§ 371 (c)(1),
(2) Date: Dec. 4, 2015

(87) PCT Pub. No.: WO2014/204285
PCT Pub. Date: Dec. 24, 2014

(65) Prior Publication Data
US 2016/0127918 A1   May 5, 2016

Related U.S. Application Data

(60) Provisional application No. 61/837,636, filed on Jun. 21, 2013, provisional application No. 61/955,191, filed on Mar. 18, 2014.

(51) Int. Cl.
*H04W 16/26* (2009.01)
*H04W 84/04* (2009.01)
(Continued)

(52) U.S. Cl.
CPC ......... *H04W 16/26* (2013.01); *H04L 5/0053* (2013.01); *H04W 72/048* (2013.01); *H04W 84/047* (2013.01); *H04L 5/001* (2013.01)

(58) Field of Classification Search
None
See application file for complete search history.

(56) References Cited

U.S. PATENT DOCUMENTS

| 2013/0100900 A1 | 4/2013 | Lee et al. |
| 2013/0155974 A1* | 6/2013 | Papasakellariou .. H04W 72/042 370/329 |

(Continued)

FOREIGN PATENT DOCUMENTS

| CN | 102300267 A | 12/2011 |
| CN | 103069763 A | 4/2013 |
| WO | WO 2013/044687 A1 | 4/2013 |

OTHER PUBLICATIONS

Alcatel-Lucent, Alcatel-Lucent Shanghai Bell "PBCH coverage extension for MTC devices", R1-130938, 3GPP TSG-RAN WG1 Meeting #72bis, Chicago, USA, Apr. 15-19, 2013. See pp. 1-3; and figures 1, 2.

(Continued)

*Primary Examiner* — Kodzovi Acolatse
(74) *Attorney, Agent, or Firm* — Birch, Stewart, Kolasch & Birch, LLP

(57) ABSTRACT

The present invention related to a method and an apparatus for enhancing coverage of an UE. The method comprising receiving a signal, wherein a control signal is received on a downlink control channel with a repeated transmission based on the reception coverage of the UE, and transmitting a control signal on an uplink control channel.

16 Claims, 11 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 2013/0272215 | A1* | 10/2013 | Khoryaev | H04W 28/02 370/329 |
| 2013/0294399 | A1* | 11/2013 | Lee | H04W 4/005 370/330 |
| 2014/0098761 | A1* | 4/2014 | Lee | H04W 74/006 370/329 |
| 2014/0286302 | A1* | 9/2014 | Khoryaev | H04W 28/24 370/330 |
| 2014/0301305 | A1* | 10/2014 | Xu | H04W 72/04 370/329 |

OTHER PUBLICATIONS

HiSilicon Huawei, "Text proposal for PBCH coverage improvement for MTC", R1-131819, 3GPP TSG RAN WG1 Meeting #72b, Chicago, USA, Apr. 15-19, 2013. See p. 1.

ITRI, "PBCH Coverage Extension for MTC Devices", R1-132256, 3GPP TSG RAN WG1 Meeting #73, Fukuoka, Japan, May 20-24, 2013. See pp. 1, 2; and figure 1.

Qualcomm Incorporated, "PBCH Coverage Enhancement", R1-131397, 3GPP TSG-RAN WG1 #72bis, Apr. 15-Apr. 19, 2013, Chicago, USA. See pp. 2, 3; and figures 2.

* cited by examiner

[Fig. 1]
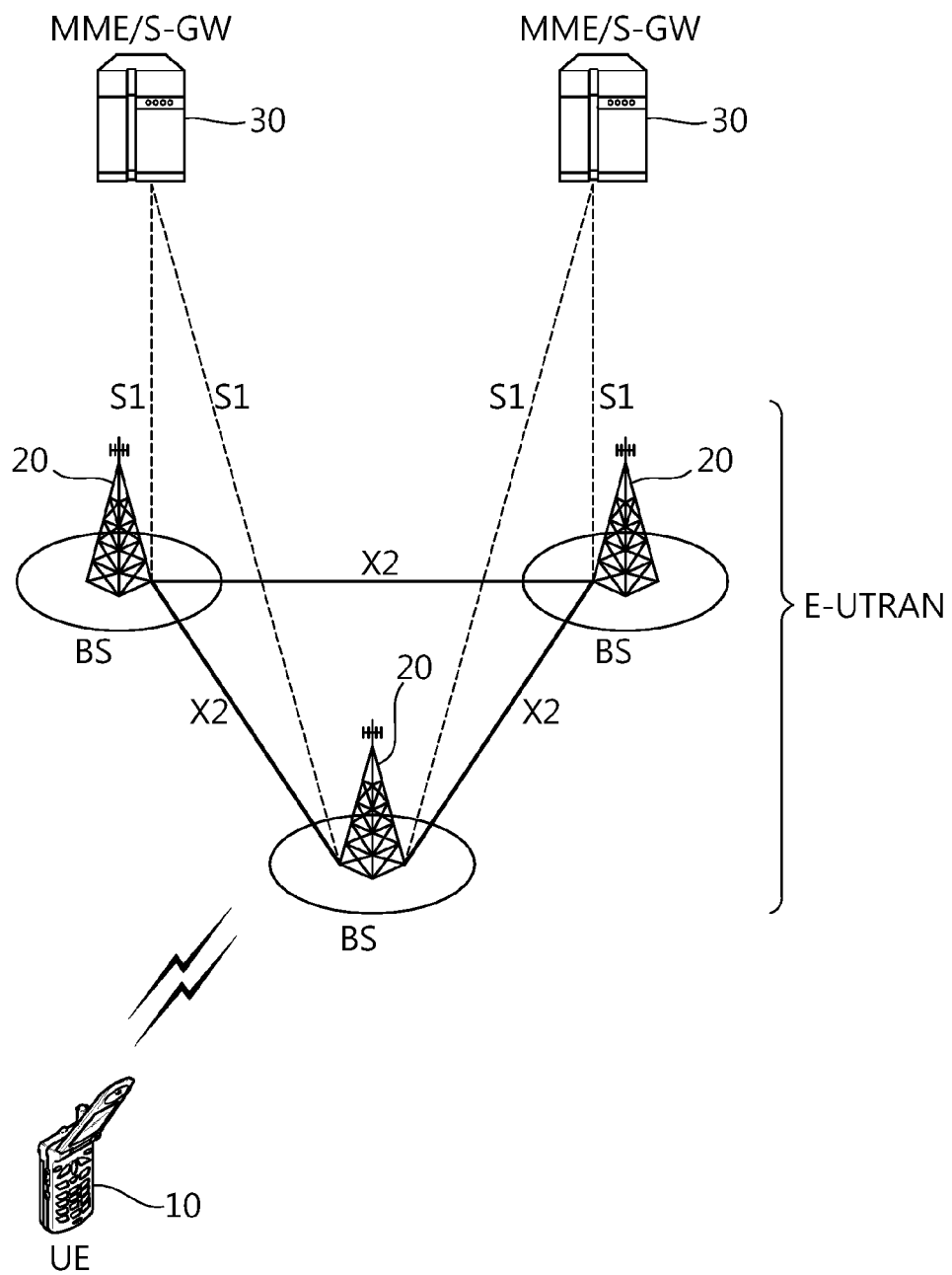

[Fig. 2]
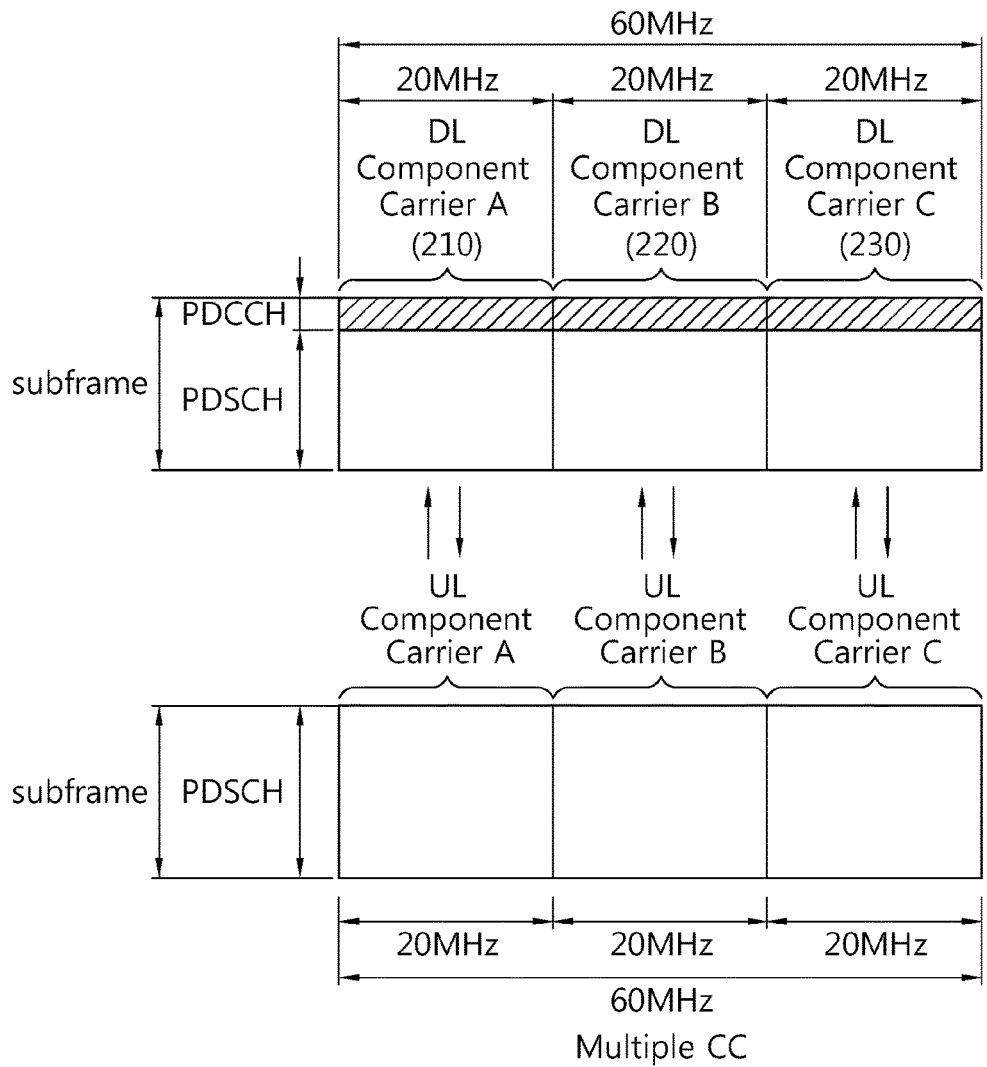
Multiple CC
[Fig. 3]
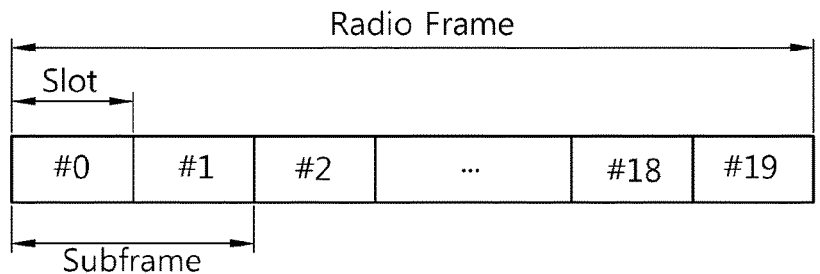

[Fig. 4]
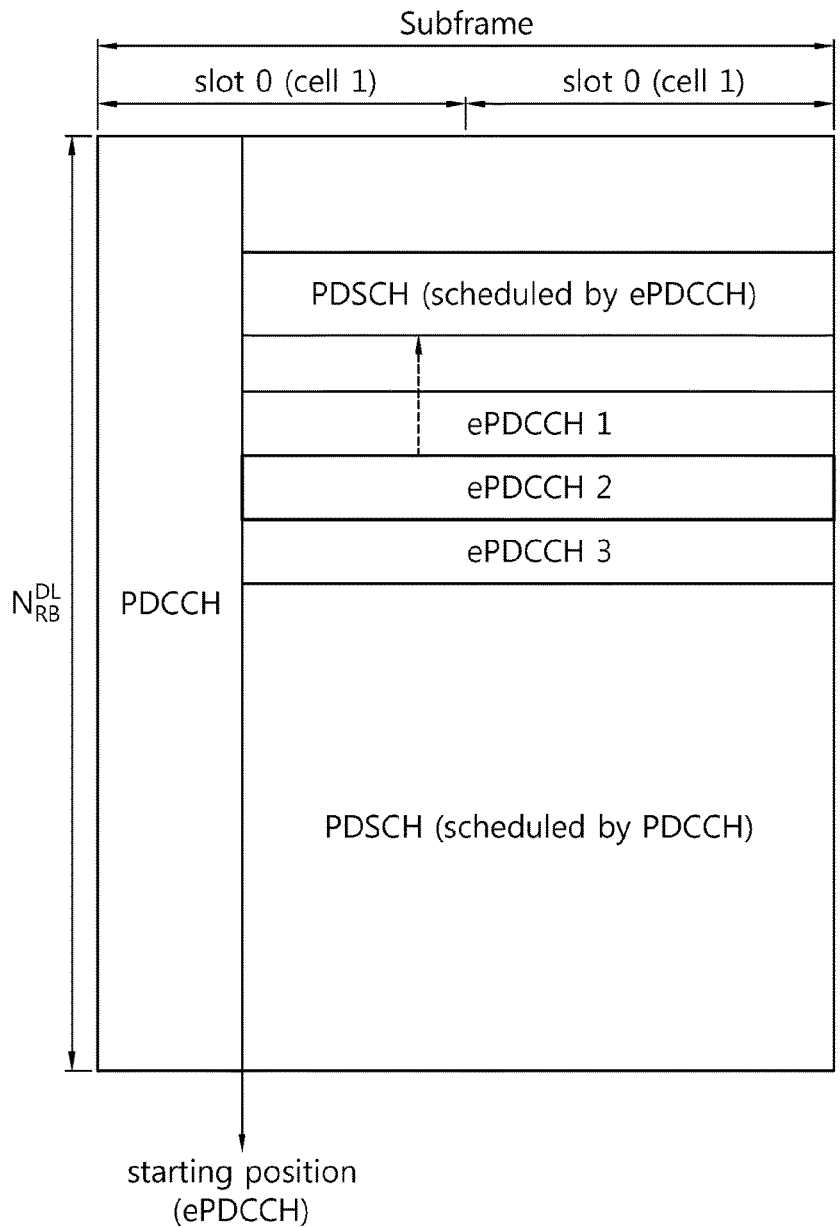
[Fig. 5a]
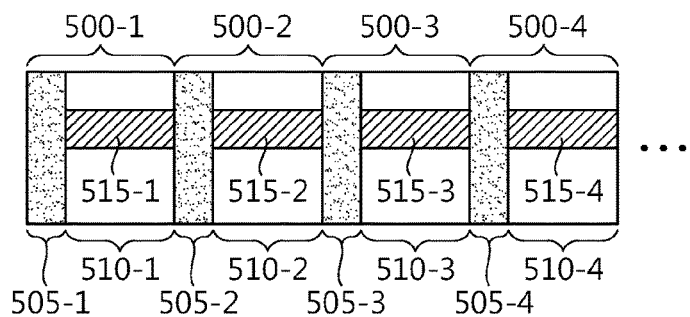

[Fig. 5b]
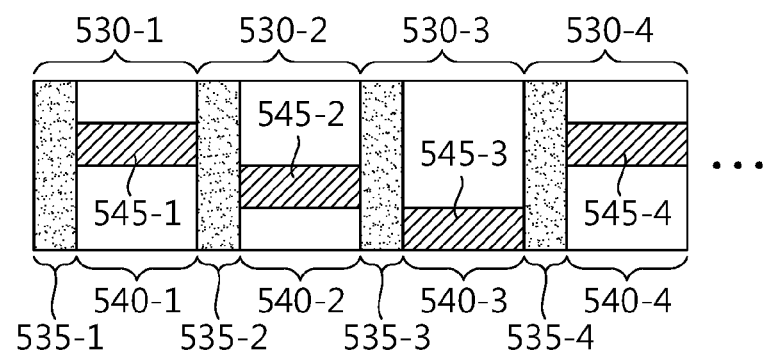
[Fig. 5c]
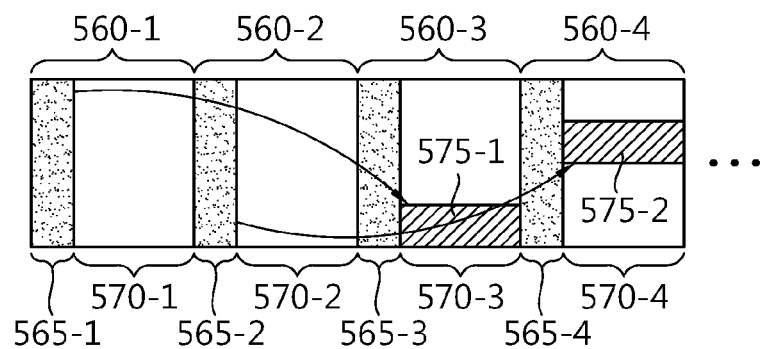

[Fig. 6]
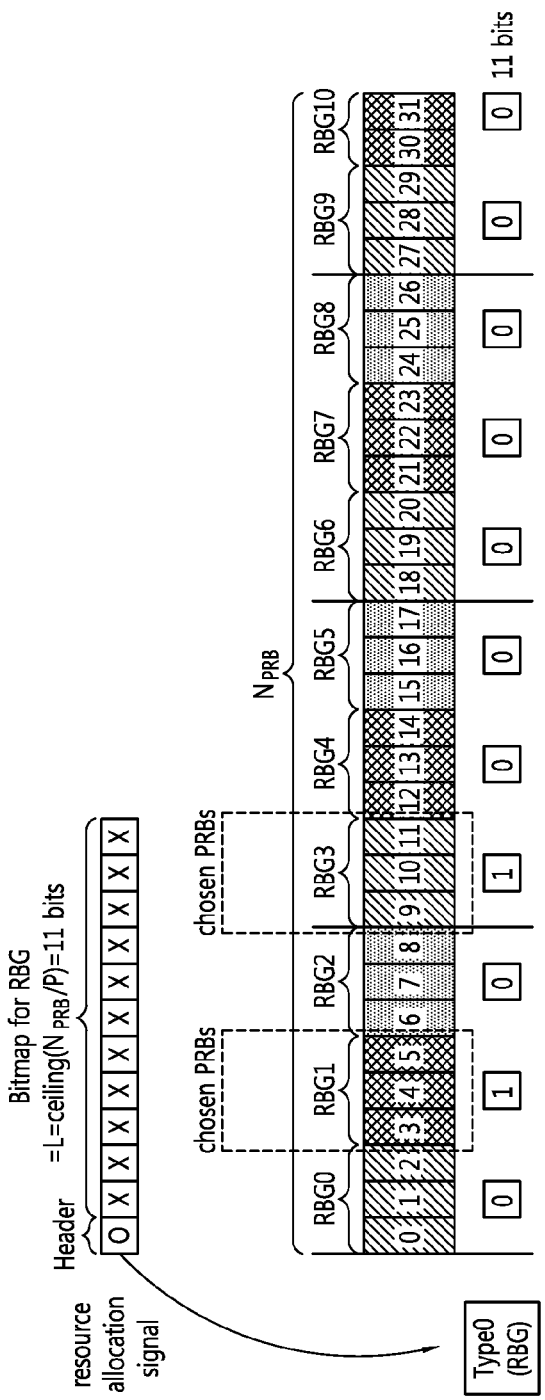

[Fig. 7]
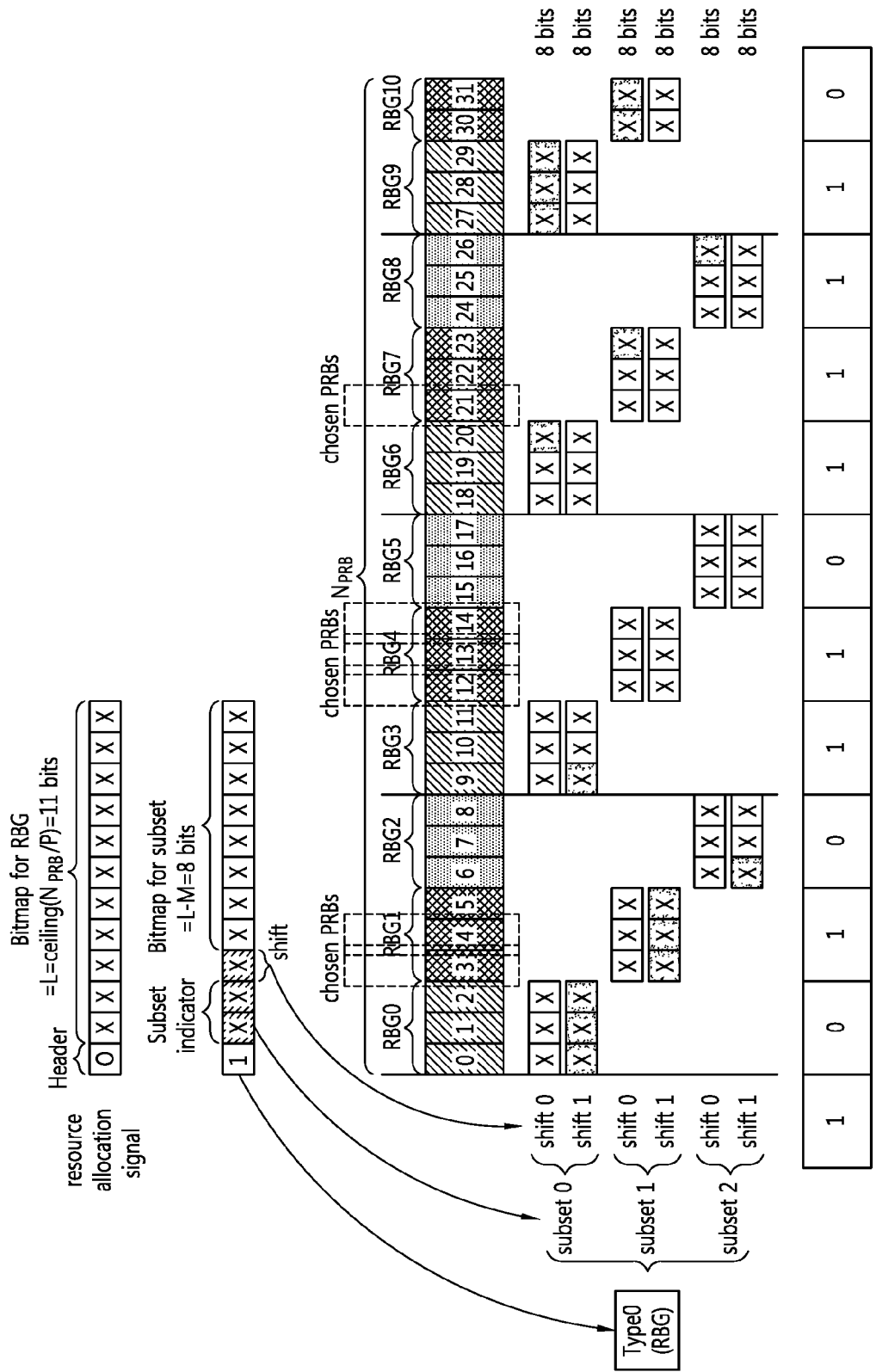

[Fig. 8a]
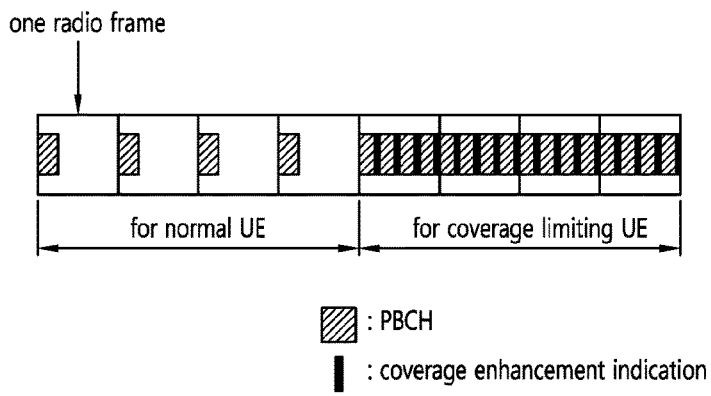
[Fig. 8b]
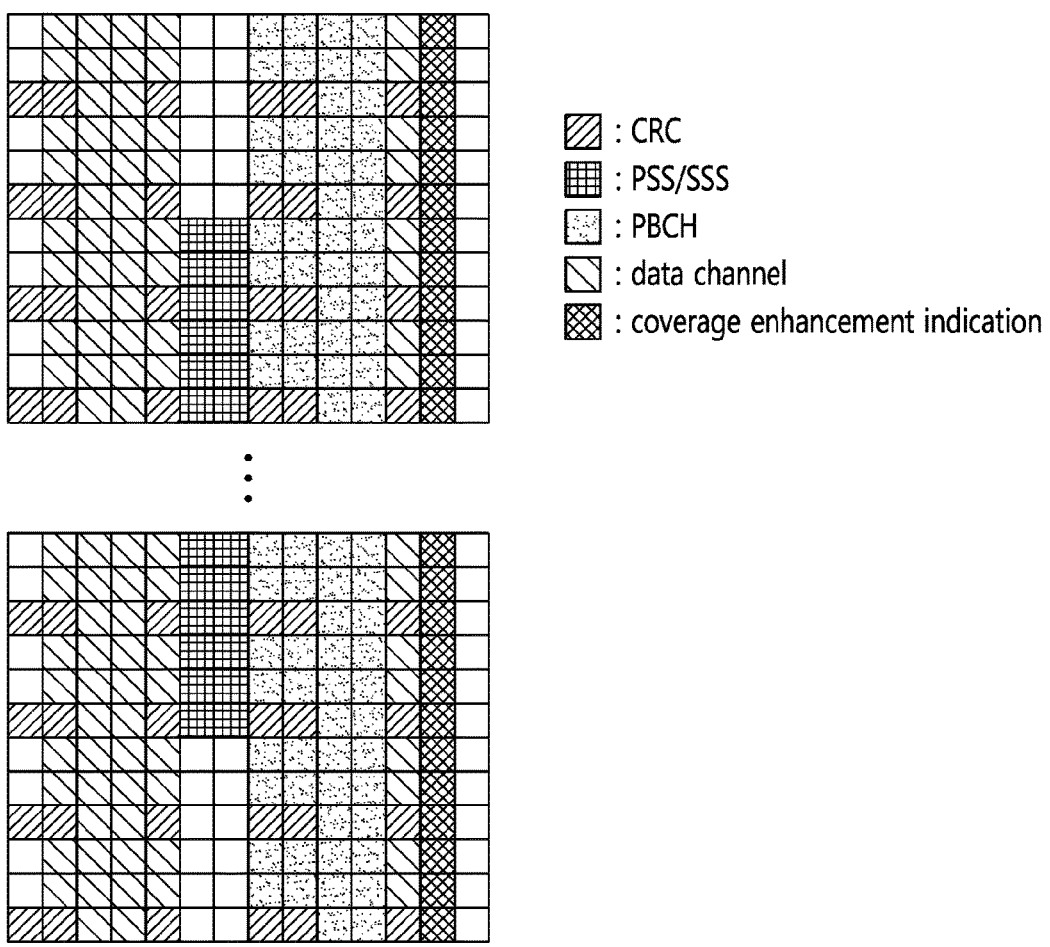

[Fig. 8c]
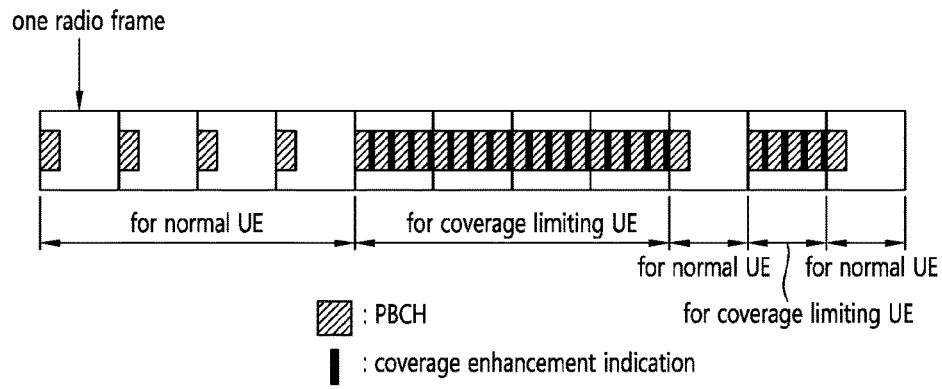
[Fig. 9a]
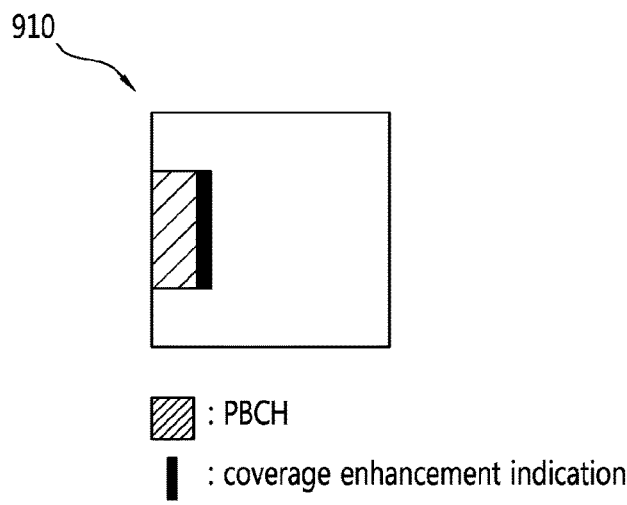
[Fig. 9b]
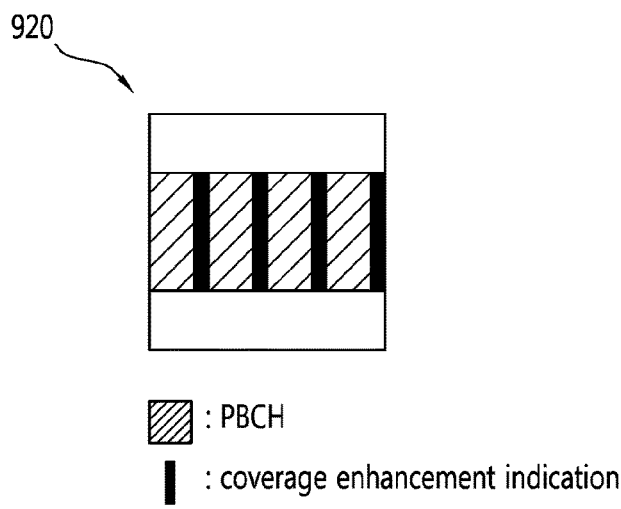

[Fig. 9c]
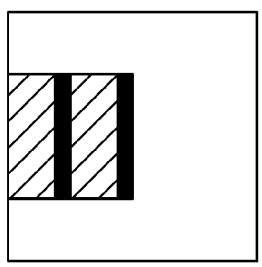
930
▨ : PBCH
▮ : coverage enhancement indication

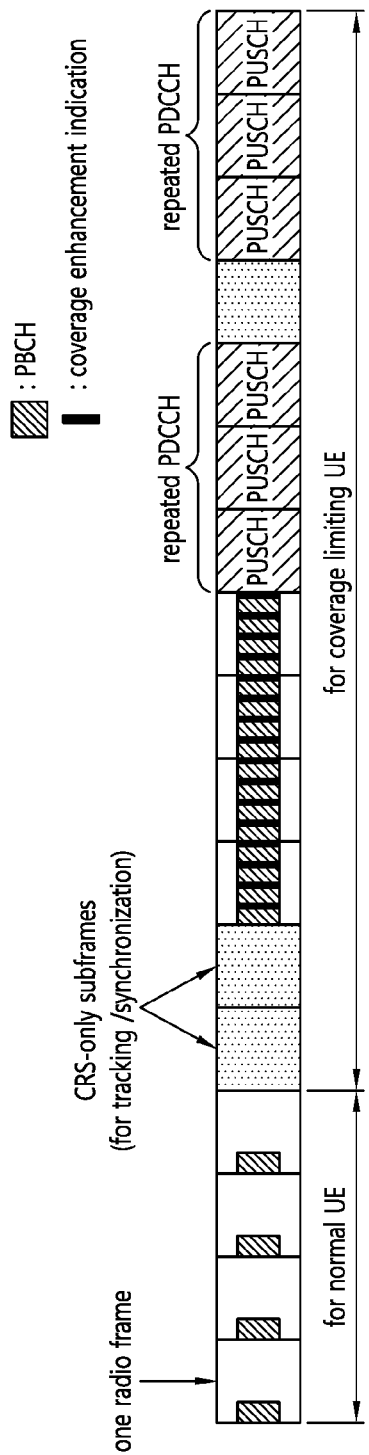
[Fig. 10]

[Fig. 11]
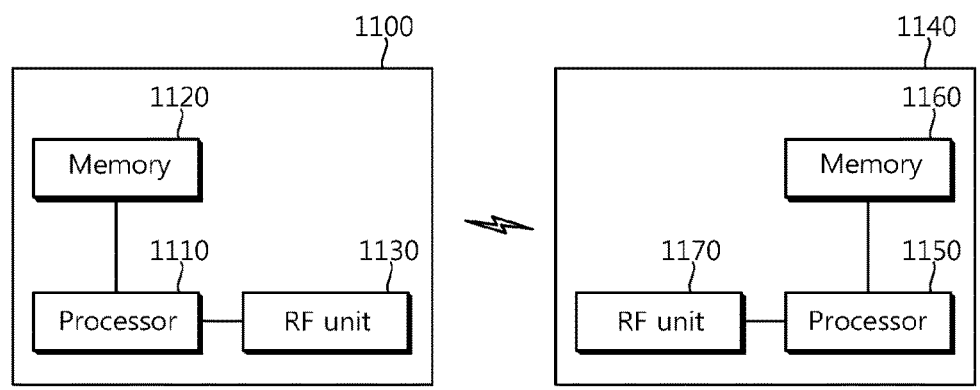
[Fig. 12]
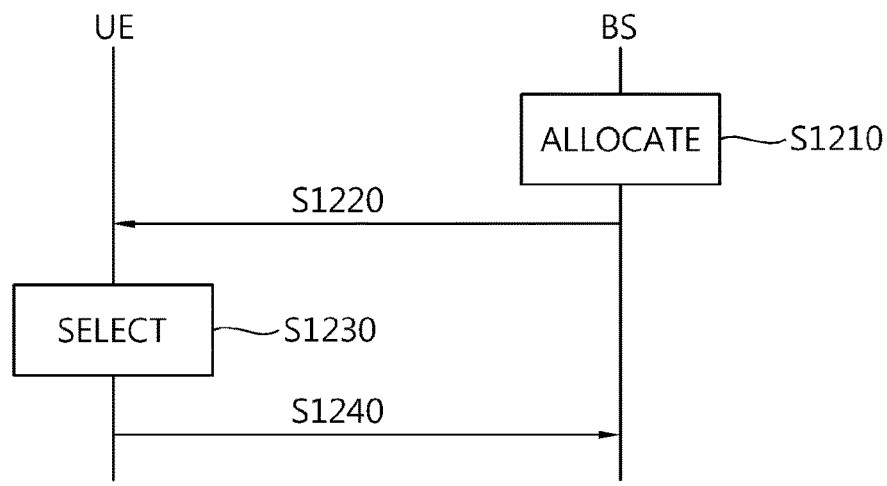

METHOD FOR ENHANCING COVERAGE OF USER EQUIPMENT AND AN APPARATUS USING THE SAME

CROSS REFERENCE TO RELATED APPLICATIONS

This application is the National Phase of PCT/KR2014/005537 filed on Jun. 23, 2014, which claims priority under 35 U.S.C. 119(e) to U.S. Provisional Application Nos. 61/837,636 filed on Jun. 21, 2013; and 61/955,191 filed on Mar. 18, 2014, all of which are hereby expressly incorporated by reference into the present application.

TECHNICAL FIELD

The present invention relates to wireless communications, and more particularly, to a method for enhancing coverage of an user equipment and an apparatus using the method.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

In next generation of LTE-A, it is considered configuring a system using a low cost and/or low specification (low performance) terminal mainly for a data communication such as reading an electric meter, measuring water level, surveillance, stock management of a vending machine, etc. The terminal may be called as machine type communication (MTC) device (MTC terminal) for a convenience of description.

As for the usage of the MTC device, it is efficient to use a MTC device with a low price and a low battery consumption since an amount of transmitted data may be small and there may occasionally be an uplink/downlink data transmission in a case of a communication using the MTC device.

SUMMARY OF INVENTION

Technical Problem

An object of the present invention is to provide a method and an apparatus for enhance the coverage of reception.

Another object of the present invention is to provide a method for enhancing coverage of reception even for the coverage limiting UE including a MTC UE and/or a low cost UE.

Another object of the present invention is to provide a method for band allocation, transmission/reception, selecting coverage status (level) in a case the UE is a coverage limiting UE including a MTC UE and/or a low cost UE.

Solution to Problem

An embodiment of the present invention relates to a method for enhancing coverage of an user equipment (UE) of which reception coverage is limited, the method comprising receiving a signal, wherein a control signal is received on a downlink control channel with a repeated transmission based on the reception coverage of the UE, and transmitting a control signal on an uplink control channel.

Another embodiment of the present invention relates to an user equipment (UE) with a limited reception coverage, the UE comprising a radio frequency (RF) unit for transmitting and receiving a radio signal, and a processor operatively coupled to the RF unit, wherein a control signal is received on a downlink control channel with a repeated transmission based on the reception coverage of the UE.

Yet another embodiment of the present invention relates to a method for enhancing coverage of an UE of which reception coverage is limited, the method comprising transmitting a signal, wherein a control signal is transmitted on a downlink control channel with a repeated transmission based on the reception coverage of the UE, and receiving a control signal on an uplink control channel.

Yet another embodiment of the present invention relates to a base station (BS) communicating with limited reception coverage, the BS comprising a radio frequency (RF) unit for transmitting and receiving a radio signal, and a processor operatively coupled to the RF unit, wherein the processor is configured for transmitting a control signal via the RF unit on a downlink control channel with a repeated transmission based on the reception coverage of the UE.

Advantageous Effects of Invention

According to the present invention, the receiving coverage can be enhanced.

According to the present invention, a band allocation, a coverage status (level) selection, a reception/transmission can be performed effectively with the coverage limiting UE including a MTC UE and/or a low cost UE can be enhanced.

According to the present invention, the receiving coverage of the coverage limiting UE including a MTC UE and/or a low cost UE can be enhanced.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

The FIGS. 5A to 5C briefly describe examples of narrow band PDSCH region assignment according to the present invention.

FIG. 6 briefly describes an example of bitmap indication of type0.

FIG. 7 briefly describes an example of bitmap indication of type1.

FIG. 8A describes briefly an example of perform coverage enhancement for a few radio frames assigned for coverage enhancement required UE.

FIG. 8B briefly describes an example of an indication signal.

FIG. 8C briefly describes another example of perform coverage enhancement for a few radio frames assigned for coverage enhancement required UE.

FIGS. 9A to 9C briefly describe examples of indication signal.

FIG. 10 briefly describes TDM between operation for a normal UE and operation for a coverage limiting UE.

FIG. 11 is a block diagram which briefly describes a wireless communication system including an UE 1100 and a BS 1140.

FIG. 12 is a flow chart which describes briefly as for the operation of the wireless system including an UE and a BS.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a Pcell (primary serving cell) is a resource in which the UE initially establishes a connection (or a RRC connection) among several serving cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (secondary serving cell) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific reference signal (CRS) may be omitted in some subframes or physical broadcast channel (PBCH) may not be transmitted.

Meanwhile, as wireless communications are to be used in various technical fields and for various purposes, it is considered configuring a system using a low cost and/or low specification (low performance) terminal mainly for a data communication such as reading an electric meter, measuring water level, surveillance, stock management of a vending machine, etc. This type of a terminal may be called as machine type communication (MTC) device (MTC UE).

As for the usage of the MTC device, it is efficient to use a MTC device with a low price and a low battery consumption since an amount of transmitted data may be small and there may occasionally be an uplink/downlink data transmission in a case of a communication using the MTC device.

In this application, methods and apparatuses for enhancing coverage of signal reception. It is efficient for such a device which operates with small amount of data and low power. The device may be a MTC device or a UE with limited coverage. Hereinafter, for convenience of descriptions, the device which operates with small amount of data and low power is called as a UE with limited coverage or a coverage limiting UE. Of course, as described, it may also mean a MTC device when 'a UE with limited coverage' or 'a coverage limiting UE' is used in this application. Even though a normal UE may be in trouble with receiving signals when it is located in a basement or located far from the BS. In this application, the UE in trouble with receiving signals may also be included in a coverage limiting UE.

Coverage of a UE can be enhanced by at least one of (1) assigning narrow bandwidth for data channel and wide bandwidth for control channel, and (2) repeated transmission of control channel. Further, (1) and/or (2) may be performed in a scalable manner, i.e. the assigning methods are performed according to levels that represent degrees of request for coverage enhancement.

For example, narrow band may assigned for data channel considering small amount of data to be received and transmitted. And, coverage of the UE may be enhanced by repeated transmission considering the small coverage of a UE such as MTC UE with low cost and/or low performance, or considering the small coverage of a UE under specific circumstances such as being in a basement or being far away.

Hereinafter, referring to figures, methods and apparatuses for enhancing coverage of a UE is described in detail.

Narrow B and Assignment for Data Channel

According to the present invention, narrow band may be assigned for a data channel, e.g. PDSCH. A list of PRBs used for PDSCH may be determined based on band assignment for PDSCH.

As described below, narrow band may be assigned for data channel (PDSCH). For the narrow band assignment, one of three options can be used to assigning narrow band for PDSCH: (1) assigning fixed narrow band, (2) assigning narrow band hopping per a predetermined unit, (3) assigning narrow band changing dynamically.

Further, with the three options, one of four methods for determining a list of PRBs may be used: (i) always using center M PRBs (M is an integer, 0≥M), (ii) indicating by signaling, (iii) using resource allocation method, and (iv) using a resource allocation table and an index indicating allocation in the table.

Here, the three options are described at first, and then the four methods for the list of PRBs are described based on the options.

(1) Option 1—Assigning Fixed Narrow Band

The FIG. 5A to 5C briefly describes examples of narrow band PDSCH region assignment according to the present invention.

FIG. 5A briefly describes an exemplary case that fixed narrow band is assigned for PDSCH. In the example of FIG. 5A, four subframes 500-1, 500-2, 500-3, 500-4 of downlink are illustrated. The subframes 500-1, 500-2, 500-3, 500-4 have regions for control channels (e.g. PDCCH) 505-1, 505-2, 505-3 and 505-4 and regions for data channel 510-1, 510-2, 510-3 and 510-4.

Referring to the FIG. 5A, data channels such as PDSCHs 515-1, 515-2, 515-3 and 515-4 with fixed band are located in regions for data channels 510-1, 510-2, 510-3 and 510-4. In this case, once the list of PRBs assigned for narrow-band PDSCH, it shall be used without change over subframes unless the list of PRBs is changed either by higher layer signaling or broadcast (e.g., MIB, SIB).

(2) Option 2—Assigning Narrow Band Hopping Per Subframe, Radio Frame, or Wake-Up FIG. 5B briefly describes an exemplary case that a band assigned for PDSCH is hopped. In the example of FIG. 5B, four subframes 530-1, 530-2, 530-3 and 530-4 of downlink are illustrated. The subframes 530-1, 530-2, 530-3 and 530-4 have regions for control channels (e.g. PDCCH) 535-1, 535-2, 535-3 and 535-4 and regions for data channel 540-1, 540-2, 540-3 and 540-4.

Referring to the FIG. 5B, data channels such as PDSCHs 545-1, 545-2, 545-3 and 545-4 are located in regions for data channels 510-1, 510-2, 510-3 and 510-4 with hopping bandwidth.

In this case, narrow band is hopping per subframe. Even though the band hops per subframe in the example of FIG. 5A, the band may also be assigned to hop per radio frame or per wake-up (from DRX or a long sleep).

For the example of FIG. 5B, the list of PRBs assigned for narrow-band PDSCH or data channel may be changed based on pre-determined pattern or a higher-layer signaled pattern. More specifically, a hopping pattern for the narrow-band PDSCH may follow the hopping for PUSCH hopping.

(3) Option 3—Assigning Narrow Band Changing Dynamically

The narrow band for the PDSCH may also be changed dynamically. In this case, the list of PRBs assigned for narrow-band PDSCH or data channel can be changed dynamically per DCI.

One approach is to use cross-subframe scheduling with wide-band resource allocation where a UE shall assume that the narrow-band for PDSCH is the PRBs assigned to PDSCH by cross-subframe scheduled DCI. FIG. 5C briefly describes an exemplary case of cross-subframe scheduling for PDSCH with narrow band. In the example of FIG. 5C, four subframes 560-1, 560-2, 560-3 and 560-4 of downlink are illustrated. The subframes 560-1, 560-2, 560-3 and 560-4 have regions for control channels (e.g. PDCCH) 565-1, 565-2, 565-3 and 565-4 and regions for data channel 570-1, 570-2, 570-3 and 570-4.

Referring to the FIG. 5C, DCI transmitted on PDCCH may indicates on which subframe and with which band PDSCH is transmitted. In the case of FIG. 5C, PDSCHs 575-1 and 575-2 are transmitted two subframe later after the subframe on which the corresponding PDCCHs have been transmitted and the narrow bands for PDSCHs are dynamically changed for each subframe as indicated by DCIs on the PDCCHs.

Another approach to change narrow band dynamically is to use a new DCI indicating the change of PRBs which can be effective in k subframe afterwards (k>=1). Using this approach as well, to receive common data channels such as SIB, it may be required to either adopt option 1 or option 2 for non cross-subframe scheduled PDSCH, semi-persistent scheduling (SPS) PDSCH, or common data channels.

However, UE may give higher priority to cross-subframe scheduled PDSCH as it may not be able to retune its PDSCH region instantly when common data channel and cross-subframe scheduled PDSCH collide in the same subframe.

As described, for all three options, the list of PRBs can be determined as one of following method for determining a list of PRBs which specifies PRBs to be used.

(i) Method 1: Always six PRBs in the center of a band allocated for a downlink signaling are determined as PRBs for PDSCH. As a low cost MTC UE may not be able to handle more than 6 PRBs, the allocation shall not exceed 6 PRBs. If it exceeds, the excessive PRBs will be ignored.

Hereinafter, the six PRBs in the center of a band allocated for a downlink signaling are called as center six PRBs for a convenience of descriptions. With Option 1, it is assumed that a UE shall read data from the center six PRBs unless it is configured otherwise. With Option2, if hopping pattern is used, it shall start with center six PRB as a starting point (ii) Method 2: The list of PRBs used for narrow-band data channel may be determined by higher layer signaling or indication by MIB. Further, the list of PRBs used for narrow-band data channel may be determined associated with user RNTI.

When this method is applied, an offset to specify starting PRB may be determined based on MIB or based on MIB and user RNTI. The M PRBs (M is an integer, 0≥M) from the starting PRB may be used for PDSCH. For example, M may be six.

Specifically, MIB may indicate the offset $OFFSET_{SP}$ to specify a starting PRB index $IDX_{SP}$. The starting PRB index $IDX_{SP}$ may be determined as either MATH 1 or MATH 2.

$$IDX_{SP}=0+OFFSET_{SP} \qquad <\text{MATH 1}>$$

$$IDX_{SP}=(\lfloor DL_{BW}^{RB}/2 \rfloor -3)+OFFSET_{SP} \qquad <\text{MATH 2}>$$

In MATH 1 and MATH 2, $OFFSET_{SP}$ may be indicated by MIB and $DL^{RB}_{BW}$ is a number of RBs in a downlink bandwidth and the offset is indicated by MIB. Consecutive M PRBs (M is an integer, 0≥M) from a PRB specified by $IDX_{SP}$ can be used for narrow-band data channels. For example, M may be six.

Or, based on a combination of MIB signaling and user RNTI assigned by the serving cell, the starting PRB index $IDX_{SP}$ can be determined. MATH 3 is an example of determining $IDX_{SP}$.

$$IDX_{SP}=DL_{BW}^{RB} \% (RNTI \% DL_{BW}^{RB})+\text{offset} \qquad <\text{MATH 3}>$$

The offset may be indicated by MIB. $DL^{RB}_{BW}$ is a number of RBs in a downlink bandwidth and the offset is indicated by MIB and 'RNTI' is a value of RNTI. Consecutive M PRBs (M is an integer, 0≥M) from a PRB specified by $IDX_{SP}$ can be used for narrow-band data channels. For example, M may be six.

The index $IDX_{SP}$ may also be determined based on sub-band determined based on PRB group or PRB bundling. UE RNTI can be used to determine a sub-band and the offset $OFFSET_{SP}$ may also be used for specifying to a starting PRB within a sub-band.

When the information is not available, UE may assume that center six PRBs are used for narrow-band data reception.

Method 3: Resource allocation method to determine PDSCH/data channel region is used for determining the list of PRBs used for narrow-band data channel.

As a low cost MTC UE may not be able to handle more than 6 PRBs, the allocation shall not exceed 6 PRBs. If it exceeds, the excessive PRBs will be ignored. It is of course that the allocation is performed with PRBs less the M PRBs when the MTC UE can handle M PRBs besides 6 PRBs.

There are three types of resource allocation to be used as this method 3: (a) bitmap indication with resource block group (RBG), (b) bitmap with offset per bitmap with RBG, and (c) compact assignment using DCI. These three type can be called as type0, type1 and type2.

Type0: PDSCH or data channel for a coverage limiting UE may be determined by bitmap indication with RBG.

FIG. 6 briefly describes an example of bitmap indication of type0. The RBG size of this example can be changed based on a system bandwidth such as table 1.

TABLE 1

| RBG size (P) | System Bandwidth |
|---|---|
| 1 | ≤10 |
| 2 | 11-26 |
| 3 | 27-63 |
| 4 | 64-110 |

Referring to the FIG. 6, $N_{PRB}$ is the number of PRBs in a system and P is the number of RBs in a PBG. RBGs are distributed to P subsets.

As shown in FIG. 6, header of a bit stream may contain information indicating type of resource allocation. The UE may select PRBs according to the indication by the bitmap.

Type1: PDSCH or data channel for a coverage limiting UE may be determined by bitmap with offset per bitmap with RBG.

FIG. 7 briefly describes an example of bitmap indication of type1. The RBG size of this example can be changed based on a system bandwidth such as table 2.

TABLE 2

| RBG size (P) | System Bandwidth |
|---|---|
| 1 | ≤10 |
| 2 | 11-26 |
| 3 | 27-63 |
| 4 | 64-110 |

Referring to the FIG. 7, $N_{PRB}$ is the number of PRBs in a system, P is the number of RBs in a PBG. RBGs are distributed to P subsets.

As shown in FIG. 6, header of a bit stream may contain information indicating type of resource allocation. A subset and a shift may be determined by the subset indicator and shift indicator in the bit stream as shown when the header of bit stream indicates the type1 is applied. The UE may select PRBs according to the indication by the bitmap applying the type indicated by the header and subset/shift specified by subset indicator and shift indicator.

Type2: Compact assignment may be applied. Distributed virtual resource block (DVRB) mapping and compact DCI can be used to assign the set of PRBs allocated for data channel. Compact DCI can be signaled by MIB, SIB or RRC signaling. If dynamic allocation is used, it can be used with cross-subframe scheduling or a new DCI can be defined for PRB allocation. The new DCI (compact DCI) are described later in this application.

Method 4: A resource allocation table and an index indicating allocation in the table can be used. A set of PRBs can be chosen based on index with a pre-configured set of resource allocation table. The index can be signalled at higher lay or signalled by MIB, SIB. Further, the index may be pre-determined based on user IP address or unique ID. For example, a table may consist of resource allocation type 0 as follows.

TABLE 3

| 1 | [0 0 1 1 0 0 0 0 0 0] |
|---|---|
| 2 | [0 0 0 1 1 0 0 0 0 0] |
| ... | — |
| 7 | [0 0 0 0 0 0 0 0 1 1] |

Based on user ID, one or more entries can be chosen for data reception when a UE is equipped with low cost UE category functionalities.

PBCH Transmission for Coverage Enhancement

For UE which needs coverage enhancement, PBCH itself may be retransmitted over either one PBCH per every subframe (or a few subframes per radio frame) or more than one PBCH per every subframe (or a few subframes per radio frame).

To minimize the impact on normal UEs which is not a coverage limiting UE, it is desirable to apply coverage enhancement techniques to a few radio frames assigned for coverage enhancement required UEs rather than to apply coverage enhancement techniques for all the subframes.

FIG. 8A describes briefly an example of perform coverage enhancement for a few radio frames assigned for coverage enhancement required UE (coverage limiting UE).

As shown in FIG. 8A, radio frames are divided into radio frames for normal UE and radio frames for coverage limiting UEs such that repetition of PBCH occurs only in radio frames/subframes assigned to coverage limiting UEs.

To indicate the assignment, a few approaches may be considered. One is to predetermine the set of radio frames used for coverage limiting UEs. The coverage limiting UEs may use either external GPS or other synchronization means so that the coverage limiting UEs can acquire the time of radio frame or subframe allocated for the coverage limiting UEs.

Another approach is to associate the radio frame or subframe where repetition of transmission occurs with cell ID such that a UE once detects the cell ID, the UE can infer the timing of repetition. It also requires external means for a UE to acquire timing.

Further, another approach of inserting a indicator into a downlink signal may be considered. The indicator may indicate whether the subframe or radio frame is used for coverage limiting UE or not. That is, when the UE detect the indicator in a subframe or radio frame, the UE may determine the subframe or the radio frame to be used for the coverage enhancement, i.e. there is repeated transmission in the subframe or the radio frame. In this application, the indicator is called as a 'coverage enhancement indication' or a 'coverage limiting indication signal' for convenience of description.

The signal into which the coverage enhancement indication inserted may be transmitted once per radio frame, once per 40 msec, or once per subframe. An example of FIG. 8A shows a case that The signal into which the coverage enhancement indication inserted is transmitted once in a subframe. In this case, the indicator may be also called as a coverage enhancement subframe indication.

Once a coverage limiting UE detects the cell ID, the coverage limiting UE may detects the coverage limiting indication signal to determine whether repeated PBCH is transmitted in that subframe or radio frame.

If the coverage limiting UE does not detect the coverage limiting indication signal, the coverage limiting UE may wait one or more radio frames before attempting another indication signals.

Meanwhile, the indication signals (the coverage limiting indication signal) may be configured such that a UE in bad coverage should be able to receive the indication signal (e.g., repeated pulse).

CRS sequence may be used as the coverage limiting indication signal which maybe be repeated in radio frames for a coverage limiting UE. One example of using CRS sequence according to the present invention is to repeat the CRS sequence assuming m=0 and repeat the same sequence over 6 PRBs for low cost UE (i.e. coverage limiting UE) or the whole system bandwidth for UEs who are able to process the whole system bandwidth.

In other words, for l=13 (in normal CP) and l=11 (in extended CP), MATH 4 may be used.

$$a_{k,l} = r_l(0) \quad <\text{MATH 4}>$$

$$r_l(0) = \frac{1}{\sqrt{2}}(1-c(0)) + j\frac{1}{\sqrt{2}}(1-2c(1)),$$

$$c_{init} = 2^{13}(l+1)(2N_{ID}^{cell}+1) + 2N_{ID}^{cell} + N_{CP}$$

Here, $a_{k,1}$ is a complex modulation symbol, $r_l$ is reference signal sequence for generating CRS, l is number of OFDM symbol in a slot, and $N^{cell}_{ID}$ is a cell ID in Physical layer. $N_{CP}$ is 1 for normal cyclic prefix (CP) and 0 for extended CP. And, c(i) is a pseudo random sequence generated from Gold sequence define from two m-sequences with m equal to 31, and is initialized at the beginning of each symbol such as $c_{init}$.

Note that actual $c_{init}$ value can be changed, which is a function of cell ID and index for normal CP and extended CP.

This is an example and the actual sequence can follow any m sequence with a prefixed index with different $c_{init}$ value.

FIG. 8B briefly describes an example of an indication signal. Referring to FIG. 8, indication signal is inserted using CRS sequence.

Alternatively, sequence used for SRS may be used for indication signal as well where necessary customization can be performed.

While example of FIG. 8A illustrates the case of continuous radio frames for a coverage limiting UE, the present invention is not confined thereto.

FIG. 8C briefly describes another example of perform coverage enhancement for a few radio frames assigned for coverage enhancement required UE. In FIG. 8, the radio frames are divided in such a way that the radio frames for the coverage limiting UE are not continuous.

In addition, while example of FIG. 8A and FIG. 8C illustrate the case of indication signal which is repeated per subframe, the present invention is not confined thereto.

FIG. 9A briefly describes an example of indication signal. In FIG. 9A, the indication signal is transmitted once in a radio frame 910.

FIG. 9B briefly describes another example of indication signal. In FIG. 9B, the indication signal is transmitted once in a subframe 910 as described in examples of FIGS. 8A and 8C. The radio frame 920 contains 10 subframes.

FIG. 9C briefly describes yet another example of indication signal. In FIG. 9C, the indication signal is transmitted per 40 msec in a radio frame 930.

Meanwhile, when repeated PBCHs are transmitted in TDD frame structure, as TDD UL/DL configuration allows the maximum 9 DL subframes, to transmit PBCHs for coverage limiting UEs, it would be necessary to utilize all the uplinks to downlink subframes as well. In radio frame used for PBCH repetition for coverage limiting UEs, regardless of SIB signaled UL/DL configuration, a coverage limiting UE may assume that all subframes would be used for downlink subframes. This may be applicable for all radio frames where repetition occurs for MIB and/or SIB transmission.

For a UE requires coverage enhancement, yet is able to process the whole system bandwidth, a mechanism to determine "repetition" blocks may be used. This would be useful when a low cost UE and non-low-cost UE requiring coverage enhancement share the common channel such as PDSCH transmission for SIB.

Assuming for a low cost UE, SIB PDSCH is transmitted in center six PRBs, additional repetition blocks can be determined for coverage limiting UEs (e.g., 0-5 PRBs, 6-11 PRBs). In addition to the first PDSCH in center six PRBs, coverage limiting UEs can read additional PDSCHs in those These correspondences may be preconfigured and the UE may select the entry based on its coverage enhancement requirement and capabilities. It may be that different entries are formed for low cost UE (coverage limiting UE) and non-low cost UE (normal UE) if necessary.

The table 4 is an example of the table of coverage enhancement requirement level.

TABLE 4

| LEVEL | Coverage Enhancement Requirement | Number of repetition for (E)PDCCH | Number of repetition for PDSCH | Aggregation Level for (E)PDCCH | Number of repetition for PRACH | PRACH Configuration Index or PRACH configuration |
|---|---|---|---|---|---|---|
| 0 | 0-3 dB (category 1 or delay tolerant MTC UE) | 2 | 4 | 32 | 4 | 1 |
| 1 | 0-3 dB (low cost UE) | 2 | 4 | 32 | 4 | 1 |
| 2 | 4-6 dB | 4 | 8 | 32 | 8 | 2 |
| 3 | 7-10 dB | 10 | 16 | 32 | 10 | 3 |
| 4 | 11-15 dB | 50 | 50 (with RS bundling) 100 (without RS bundling) | 32 | 20 | 4 |
|  | 16-20 dB | 100 | 150 (with RS bundling) 200 (without RS bundling) | 32 | 200 | 5 | preconfigured/higher-layer configured additional blocks for coverage enhancements.

In addition to repetition blocks in the same subframe, other resource in different subframes can be determined as repetition blocks where these additional resource may be allocated by separate DCI or not.

If no separate DCI is used, the DCI schedules first PDSCH in center 6 PRBs can be applicable to all repetition blocks assigned to either the same subframe or different subframes.

This repetition technique would make sense when a coverage limiting UE can decode PDCCH successfully with either by higher layer aggregation or other means within a subframe and then can decode multiple PDSCHs repeated over multiple resources.

Scalable Design for Coverage Enhancement

Here, scalable design for coverage enhancement is provided according to the required coverage enhancement and/or the UE capabilities.

For performing scalable coverage enhancement, at least one of the four schemes may be used: (1) Using table of coverage enhancement requirement level, (2) Asymmetrical handling of downlink and uplink, (3) Using configuration of CRS only subframe, and (4) Defining and using compact DCI.

(1) Using Table of Coverage Enhancement Requirement Level

On a table of coverage enhancement requirement level, the coverage enhancement requirement level (hereinafter, 'coverage level') may be corresponded to a combination of (i) the number of repetition for PDCCH or ePDCCH, (ii) the number of repetition for PDSCH, (iii) aggregation level for PDCCH or PDCCH, (iii) the number of repetition for PRACH (PRACH configuration), etc.

Here, UE of category 1 includes a coverage limiting UE.

Based on reading primary synchronization signal (PSS)/secondary synchronization signal (SSS), a UE may determine its coverage level and select the right entry for repetition. Once the UE has selected the entry, the UE shall use the PRACH resource properly so that an eNB also knows the coverage level that UE has selected.

Note that numbers and configurations in the table 4 are an example of the present invention and the present invention is not confined with the specifics in the table 4.

(2) A Symmetrical Handling of Downlink and Uplink

If not TDD frame structure, the coverage or channel condition between downlink and uplink can be dissimilar.

In this case, coverage enhancement requirement that UE shall indicate to eNB either by explicit indication or by using the allocated PRACH resource for each coverage enhancement as shown in the table 4, can be applied to downlink where the coverage enhancement for uplink may not be known unless eNB feedbacks its coverage enhancement requirement to the UE.

To address this, one of two approaches may be applied.

As the first approach, a UE may assume that the maximum coverage enhancement is necessary (e.g., 20 dB) and uses the number of repetition or new format for that target. When eNB detects the PRACH, it may determine the actual coverage enhancement requirement that UE shall follow which can be either higher layer signaled or configured so that the UE can limit the number of repetition or other techniques accordingly for the required coverage enhancement. The information may be delivered by random access response or other messages.

As the second approach, an adaptation where a UE starts with PRACH repetition may be used, assuming the symmetric uplink/downlink coverage enhancement requirement.

When the UE does not receive random access response (RAR) until the random access response waiting timer expires, the UE may increase its uplink coverage enhancement requirement to the next coverage level with properly configured repetition and/or new format.

For example, as coverage level goes up, the number of repetition in downlink transmission and aggregation level are increased as shown in the example of table 4. Accordingly, the coverage of the US becomes enhanced.

Note that the response waiting timer shall be configured such that the time duration is proportional to the number of repetition or the required coverage enhancement since the latency of transmitting and getting the response may take longer as the required enhancement becomes larger. When it receives RAR with the required coverage enhancement, until it is configured with different requirement, the UE shall use the configured requirement.

However, a UE may increase its required coverage enhancement level when it does not receive acknowledgement (either explicitly or implicitly) so that reliable uplink transmission can be accomplished.

(3) Using CRS-Only Subframes

It is desirable to TDM between normal operation targeting normal UE and low spectral efficiency mode targeting coverage-limiting UE.

FIG. 10 briefly describes TDM between operation for a normal UE and operation for a coverage limiting UE.

In low spectral efficiency mode, it is likely that PBCH transmission would be occurred first (assuming a coverage-limiting UE may have acquired PSS/SSS already).

To aid tracking performance quickly and increase signal-to-noise ratio (SNR), "CRS-only" subframes where only CRS is transmitted without anything, may be transmitted as shown in FIG. 10. Once the signal is tracked and SNR is increased, the UE may receive signal effectively. Since, all the power is accumulated over CRS REs in CRS only subframe to enhance the coverage of CRS, the UE is supposed to track the signal with high performance.

An UE may expect to have CRS-only subframes periodically which can be signalled by MIB or pre-determined. In CRS-only subframes, all the power is accumulated over CRS REs to enhance the coverage of CRS. The period and the number of subframes or radio frames where CRS-only subframe exist can be higher layer configured or indicated by MIB or SIB. Or, it can be pre-configured to the UE.

(4) Compact DCI for a Low Cost MTC UE

When a MTC UE is supported with low cost UE category where a UE may not be able to support large system bandwidth for data reception and single RX antenna, it is considerable to consider reducing resource allocation field and limit the supported rank. Here, MTC UE may be a coverage limiting UE.

Recently, for supporting eight layer spatial multiplexing, transmission mode 9 has been introduced. TM9 is configured to reduce interference between base stations and to make signal stable. The TM9 enables the enhancement of network capabilities and performance with minimum addition of overhead. In TM9, high spectrum efficiency (using higher order MIMO) and cell-edge data rates, coverage and interference management (using beamforming) are provided. In addition, Flexible and dynamic switching between single-user MIMO (SU-MIMO) and an enhanced version of multi-user MIMO (MU-MIMO) is also provided. AS a DCI format to support TM 9, DCI format 2C was introduced.

However, when transmission mode 9 (TM9) is supported for a low cost MTC UE, DCI 2C may be too heavy (or occurs high overhead) as a low cost MTC UE may not support more than 1 layer. Thus, it needs to reduce the size of DCI 2C by removing second codeword associated DCI fields and restricting the values of $n_{scid}$ usable for single layer.

In this application, the transmission mode for MTC UE may be called TM9' or mode 9' for convenience of description. For TM9', new DCI format can be defined. In this application, the new DCI format may be called as DCI format 2C' and DCI using the DCI format 2C' may be called as a compact DCI.

Table 5 briefly explains TM9' and DCI formats used in TM9'.

TABLE 5

| Mode 9' | DCI format 1A | Common and UE specific by C-RNTI | Non-MBSEN subframe: If the number of PBCH antenna ports is one, Single-antenna port, port 0 is used, otherwise Transmit diversity (see subclause 7.1.2)<br>MBSEN subframe: Single-antenna port, port 7 |
|---|---|---|---|
| | DCI format 2C' | UE specific by C-RNTI | Up to 1 layer transmission, port 7 or 8 |

As described, TM9' for MTC UE, Format 2C' may be used.

Descriptions are provided for information transmitted by means of the DCI format 2C' as below:

(a) Carrier indicator (0 or 3 bits)

This field may not be necessary because a MTC UE may not support carrier aggregation or cross-carrier scheduling.

(b) Resource allocation header (1 bit, resource allocation type 0/type 1)

If downlink bandwidth is less than or equal to 10 PRBs, there is no resource allocation header and resource allocation type 0 is assumed. In this case, if semi-static monitoring PRB allocation is configured and thus a UE monitors only maximum 6 PRBs at a subframe, a UE may assume that downlink bandwidth is 6 PRB regardless of system bandwidth.

Thus, this field may not be used as 'resource allocation header' for a low cost MTC UE. However, if a low cost MTC UE uses cross-subframe scheduling, no restriction on the number of PRBs used in resource allocation field is necessary. In that case, this field can be present as well.

In other words, if the downlink bandwidth used in resource allocation field in DCI is smaller than the system bandwidth (such as 6 PRBs or 15 PRBs), this field may not be present and thus DCI size can be reduced. Otherwise, this field can be used to indicate either resource allocation type 0 or 1. While Resource allocation type 0 and Resource allocation type 1 allocate resources using a bitmap and each bit represents, the resource allocation type 1 allocates resources based on RBG subset.

(c) Resource block assignment:

For resource allocation type 0, $\lceil N_{RB}^{DL}/P \rceil$ bits are provided for the resource allocation. $N_{RB}^{DL}$ is a number of downlink RBs and P is a size of RBG. In this case, $\lceil N_{RB}^{DL} \rceil = 6$ may be assumed. Overall, the downlink bandwidth for UE-specific search space or different transmission scheme (other than DCI 1A based such as DCI 1/DCI 1A/DCI 1B/DCI 1C/DCI 1D/DCI 2/DCI 2A/DCI 2B/DCI 2C/DCI 2D based transmission scheme) can be assumed as '6 PRBs' or a lower bandwidth than system bandwidth for a UE supporting different bandwidth between control channel and data channel or support lower data bandwidth.

It is further assumed that the downlink bandwidth ($\lceil N_{RB}^{DL} \rceil$) can be higher layer configured for the UE-specific transmission scheme. If this is higher layer configured, UE can assume different $\lceil N_{RB}^{DL} \rceil$ value used for DCI 1A/0 for other UE-specific transmission scheme.

This can be inferred from the configuration of cross-subframe scheduling. When a UE is configured with cross-subframe scheduling, it is expected that whether to use cross-subframe scheduling or not can be higher layer configured.

If cross-subframe scheduling is configured, $\lceil N_{RB}^{DL} \rceil$ can be assumed to be constant regardless of transmission scheme. Or, when a number of PRBs for monitoring is configured by higher layer or predetermined, a UE may assume that a different bandwidth can be used per transmission scheme of each transmission mode.

For resource allocation type 1, this field is used only if downlink bandwidth is same as system bandwidth regardless of actual data bandwidth such as via cross-subframe scheduling.

$\lceil \log_2(P) \rceil$ bits of this field are used as a header specific to this resource allocation type to indicate the selected resource blocks subset. 1 bit indicates a shift of the resource allocation span and ($\lceil N_{RB}^{DL}/P \rceil - \lceil \log_2(P) \rceil - 1$) bits are provided for the resource allocation.

where the value of P depends on the number of DL resource blocks. As described above, $N_{RB}^{DL}$ is a number of downlink RBs and P is a size of RBG.

(d) Transmit Power Control (TPC) command for PUCCH (2 bits)

(e) Downlink Assignment Index (2 bits)

this field is present in TDD for all the uplink-downlink configurations and only applies to TDD operation with uplink-downlink configuration 1-6.

Table 6 describes uplink-downlink configurations.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

This field is not present in FDD—2 bits (f) HARQ process number (3 bits for FDD, 4 bits for TDD)

(g) Antenna port(s), scrambling identity and number of layers (2 bits instead of 3 bits)

This fields are specified in Table 6. However, DCI format 2C' do not support layer structure described before and this can be seen in Table 7. Table 7 describes antenna port(s), scrambling identity and number of layers indication. $n_{SCID}$ is the scrambling identity for antenna ports 7 and 8.

TABLE 7

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SDID} = 0$ | ~~0~~ | ~~2 layers, ports 7-8~~ ~~$n_{SCID} = 0$~~ |
| 1 | 1 layer, port 7, $n_{SDID} = 1$ | ~~1~~ | ~~2 layers, ports 7-8~~ ~~$n_{SCID} = 1$~~ |
| 2 | 1 layer, port 8, $n_{SDID} = 0$ | ~~2~~ | ~~3 layers, ports 7-9~~ |
| 3 | 1 layer, port 8, $n_{SDID} = 1$ | ~~3~~ | ~~4 layers, ports 7-10~~ |
| 4 | ~~2 layers, ports 7-8~~ reserved | 4 | ~~5 layers, ports 7-11~~ |
| 5 | ~~3 layers, ports 7-9~~ reserved | ~~5~~ | ~~6 layers, ports 7-12~~ |
| 6 | ~~4 layers, ports 7-10~~ reserved | ~~6~~ | ~~7 layers, ports 7-13~~ |
| 7 | Reserved | ~~7~~ | ~~8 layers, ports 7-14~~ |

(h) SRS request ([0-1] bit)

This field can only be present for TDD.

Besides above mentioned information, for transport block 1 (first transport block), modulation and coding scheme (5 bits), new data indicator (1 bit), redundancy version (2 bits), etc. may be transmitted by means of DCI format 2C' for transport block 1. However, transport block 2 (second transport block) would not be used because single codeword will be used for MTC UE.

The similar technique can be applicable to other transmission mode such as TM10 where a UE may support only one CSI process and support up to single layer and thus second codeword associated DCI fields and other unnecessary field such as PQI field can be removed. For DCI 2A, second transport block MCS, NDI, RV can be removed to create DCI 2A' (similarly for DCI 2, and 2B).

For a low cost MTC UE, when a TM is configured, even without additional signalling, it can assume that different DCI format is used which reduces its size according to downlink bandwidth and single layer operation.

Thus, for example, when a UE is configured with TM9, the DCI format 2C' will be used for a low cost MTC UE whereas other legacy UEs use DCI format 2C.

Alternatively, it can be further considered to define different TMs for a low cost MTC UE which shares the same behavior for DCI 1A based transmission scheme and may have different behavior in terms of UE-specific transmission scheme.

FIG. 11 is a block diagram which briefly describes a wireless communication system including an UE 1100 and a BS 1140. The UE 1100 and the BS 1140 may operate based on the description as explained above.

In view of downlink, a transmitter may be a part of the BS 1140 and a receiver may be a part of the UE 1100. In view of uplink, a transmitter may be a part of the UE 1100 and a receiver may be a part of the BS 1140.

Referring to FIG. 11, the UE 1100 may include a processor 1110, a memory 1120 and a radio frequency (RF) unit 1130.

The processor 1110 may be configured to implement proposed procedures and/or methods described in this application. For example, the processor 1110 may obtain a data signal on the downlink data channel with narrow band. The processor 1110 also may obtain a control signal on the downlink control channel which is repeated transmitted at predetermined radio frames or subframes, etc. Further, the radio frame or subframe, in which control channels are transmitted repeatedly, may be indicated. In addition, the processor 1110 may select and/or change the coverage level, and may indicate it to the BS. The details are same as described above.

The memory 1120 is coupled with the processor 1110 and stores a variety of information to operate the processor 1110, which includes data information and/or control information. The RF unit 1130 is also coupled with the processor 1110. The RF unit 1130 may transmit and/or receive a radio signal.

The BS 1140 may include a processor 1150, a memory 1160 and a RF unit 1170.

The processor 1150 may be configured to implement proposed procedures and/or methods described in this application. For example, the processor 1150 may allocate a narrow band to a data channel for a coverage limiting UE. The processor may also transmit a control signal or a control channel repeatedly in a predetermined radio frames. Further, the processor 1140 may indicate the radio frame or subframe, in which control channels are transmitted repeatedly. In addition, the processor 1140 may transmit signals according to the coverage level which may be selected and indicated by a UE. The details are same as described above.

The memory 1160 is coupled with the processor 1150 and stores a variety of information to operate the processor 1150, which includes data information and/or control information. The RF unit 1170 is also coupled with the processor 1150. The RF unit 1170 may transmit and/or receive a radio signal.

The UE 1100 and/or the BS 1140 may have single antenna or multiple antennas. The wireless communication system may be called as multiple input/multiple output (MIMO) system when at least one of the UE 1100 and the BS 1140 has multiple antennas.

FIG. 12 is a flow chart which describes briefly as for the operation of the wireless system including an UE and a BS. The UE and the BS may operate based on the description as explained above.

Referring to FIG. 12, the BS may allocate a narrow band to a data channel for a coverage limiting UE at a step of S1210. The BS may also allocate radio frames or subframes in which a control signal or a control channel transmitted repeatedly for a coverage limiting UE. In addition, the BS may allocate or change a band for the coverage limiting UE according to the coverage level which may be selected and indicated by a UE. The BS may also allocate or change the radio frame/subframe for the coverage limiting UE according to the coverage level which may be selected and indicated by a UE. The details are same as described above.

The BS may transmit a signal based on the allocation for the coverage limiting UE at a step of S1220. The signal may transmit with the allocated band and/or the allocated radio frame/subframe. The details are already described above.

As downlink signals are transmitted under such a configuration for the coverage limiting UE, the UE may receive the downlink signal with an enhanced coverage.

The UE may select coverage level at a step of S1230. The UE may select the coverage level using such a table 4 as described before.

The UE may transmit an uplink signal at a step of S1240. The uplink signal may include an indicator which indicates which coverage level is selected by the UE. The UE may change the coverage level and indicate the changed coverage level to the BS when the UE did not receive a response for the selected coverage level from the BS as In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method for enhancing coverage of a user equipment (UE) of which reception coverage is limited, by the UE, the method comprising:
   receiving a control signal including downlink control information (DCI) on a downlink control channel with a repeated transmission based on the reception coverage of the UE; and
   receiving a data signal on a downlink data channel with a narrow bandwidth less than a whole downlink bandwidth,
   wherein the narrow bandwidth is changed based on the DCI with a priority to a transmission on a cross-subframe scheduled downlink shared channel,
   wherein a number of the repeated transmission of the downlink control channel is classified based on a coverage level, and the coverage level is configured in a way that the higher the coverage level is, the more the downlink control channel is transmitted, and
   wherein the method comprises increasing the coverage level when a confirmation signal corresponding to a signal notifying the coverage level selected by the UE is not received from a base station (BS).

2. The method of claim 1, wherein the narrow bandwidth hops per a subframe or per a radio frame within the whole downlink bandwidth.

3. The method of claim 1, wherein the downlink control channel is transmitted repeatedly over first radio frames for the UE of which reception coverage is limited, and
   wherein radio frames for downlink transmission are divided into the first radio frames for the UE of which reception coverage is limited and second radio frames for a UE of which reception coverage is not limited.

4. The method of claim 3, wherein the downlink control channel transmitted repeatedly is a broadcast channel.

5. The method of claim 1, further comprising:
   receiving an indicator specifying whether the downlink control channel is transmitted in a radio frame in which the indicator is transmitted.

6. The method of claim 5, wherein the indicator is transmitted as a sequence for a cell-specific reference signal (CRS) or a sounding reference signal (SRS).

7. The method of claim 1, wherein the UE of which reception coverage is limited, is a machine type communication (MTC) UE.

8. A user equipment (UE) with a limited reception coverage, the UE comprising:
   a radio frequency (RF) unit for transmitting and receiving a radio signal; and a processor, operatively coupled to the RF unit, that:
- controls the RF unit to receive a control signal including downlink control information (DCI) on a downlink control channel with a repeated transmission based on the reception coverage of the UE, and
- controls the RF unit to receive a data signal on a downlink data channel with a narrow bandwidth less than a whole downlink bandwidth,
- wherein the narrow bandwidth is changed based on the DCI with a priority to a transmission on a cross-subframe scheduled downlink shared channel,
- wherein a number of the repeated transmission of the downlink control channel is classified based on a coverage level, and the coverage level is configured in a way that the higher the coverage level is, the more the downlink control channel is transmitted, and
- wherein the coverage level is increased when a confirmation signal corresponding to a signal notifying the coverage level selected by the UE is not received from a base station (BS).

9. A method for enhancing coverage of a user equipment (UE) of which reception coverage is limited, by a base station (BS), the method comprising:
- transmitting a control signal including downlink control information (DCI) on a downlink control channel with a repeated transmission based on the reception coverage of the UE; and
- transmitting a data signal on a downlink data channel with a narrow bandwidth less than a whole downlink bandwidth,
- wherein the narrow bandwidth is changed based on the DCI with a priority to a transmission on a cross-subframe scheduled downlink shared channel;
- transmitting the downlink control channel repeatedly as many as the number classified based on the coverage level; and
- changing the number of the repeated transmission of the downlink control channel when a signal indicating that the coverage level is changed is received from the UE,
- wherein the number of the repeated transmission of the downlink control channel is classified based on a coverage level, and the coverage level is configured in a way that the higher the coverage level is, the more the downlink control channel is transmitted.

10. The method of claim 9, wherein the narrow bandwidth hops per a subframe or per a radio frame within the whole downlink bandwidth.

11. The method of claim 9, further comprising:
- dividing radio frames for downlink transmission into first radio frames for the UE of which reception coverage is limited and second radio frames for a UE of which reception coverage is not limited; and
- transmitting the downlink control channel repeatedly over the first radio frames for the UE of which reception coverage is limited.

12. The method of claim 11, wherein the downlink control channel transmitted repeatedly is a broadcast channel.

13. The method of claim 9, further comprising:
- transmitting an indicator which specifies whether the downlink control channel is transmitted in a radio frame in which the indicator is transmitted.

14. The method of claim 13, wherein the indicator is transmitted as a sequence for a cell-specific reference signal (CRS) or a sounding reference signal (SRS).

15. The method of claim 9, wherein the UE of which reception coverage is limited, is a machine type communication (MTC) UE.

16. A base station (BS) communicating with limited reception coverage, the BS comprising:
- a radio frequency (RF) unit for transmitting and receiving a radio signal; and
- a processor, operatively coupled to the RF unit, that:
  - controls the RF unit to transmit a control signal including downlink control information (DCI) on a downlink control channel with a repeated transmission based on reception coverage of a user equipment (UE),
  - controls the RF unit to transmit a data signal on a downlink data channel with a narrow bandwidth less than a whole downlink bandwidth,
  - wherein the narrow bandwidth is changed based on the DCI with a priority to a transmission on a cross-subframe scheduled downlink shared channel,
  - transmits the downlink control channel repeatedly as many as the number classified based on the coverage level, and
  - changes the number of the repeated transmission of the downlink control channel when a signal indicating that the coverage level is changed is received from the UE,
  - wherein the number of the repeated transmission of the downlink control channel is classified based on a coverage level, and the coverage level is configured in a way that the higher the coverage level is, the more the downlink control channel is transmitted.

* * * * *